US005095766A

United States Patent [19]

Knappe et al.

[11] Patent Number: 5,095,766

[45] Date of Patent: Mar. 17, 1992

[54] WINDOW-ACTUATOR DRIVE UNIT

[75] Inventors: Wolfram Knappe, Kitzingen; Peter Adam, Hoechberg; Peter Michel, Kleinrinderfeld, all of Fed. Rep. of Germany

[73] Assignee: Siemens Aktiengesellschaft, Munich and Berlin, Fed. Rep. of Germany

[21] Appl. No.: 713,044

[22] Filed: Jun. 7, 1991

Related U.S. Application Data

[63] Continuation of Ser. No. 411,056, Sep. 22, 1989, abandoned.

[30] Foreign Application Priority Data

Sep. 30, 1988 [EP] European Pat. Off. ........... 88116227

[51] Int. Cl.[5] ........................ F16H 27/02; E05F 11/48

[52] U.S. Cl. ................................ 74/89.22; 74/89.20; 74/505; 49/352

[58] Field of Search .................... 74/89.20, 89.22, 411, 74/505; 49/349, 352

[56] References Cited

U.S. PATENT DOCUMENTS

| | | | |
|---|---|---|---|
| 4,191,060 | 3/1980 | Sessa | 49/352 X |
| 4,216,624 | 8/1980 | Blankenburg et al. | 74/89.20 |
| 4,534,233 | 8/1985 | Hamaguchi | 49/352 X |
| 4,770,056 | 9/1988 | Becker et al. | 74/505 |
| 4,821,589 | 4/1989 | Fukumoto et al. | 74/89.22 |

FOREIGN PATENT DOCUMENTS

| | | | |
|---|---|---|---|
| 0261525 | 3/1988 | European Pat. Off. | 74/505 |
| 3519056 | 7/1987 | Fed. Rep. of Germany | 74/505 |
| 2016642 | 9/1979 | United Kingdom | 74/89.2 |
| 2121870 | 1/1984 | United Kingdom | 74/505 |

*Primary Examiner*—Vinh T. Luong

*Attorney, Agent, or Firm*—Kenyon & Kenyon

[57] ABSTRACT

A window-actuator drive unit includes a driving disk, which is rotatably supported on an axle of the gear housing. The driving disk is placed in a rotational-slave relationship with the worm gear of a reduction gearing which is connected on the load side to an electric drive motor. The driving disk is connected to the worm gear by way of a damping separator and on its unattached end is a shaft collar which has outer teeth used for an interlocking, rotational-slave relationship either with a cable pulley of a cable window actuator or the driving pinion of an arm or scissors-type window-actuator. The inner teeth of both the cable pulley and the driving pinion correspond to the outer teeth of the shaft collar.

7 Claims, 2 Drawing Sheets

WINDOW-ACTUATOR DRIVE UNIT

This application is a continuation of application Ser. No. 411,056, filed Sept. 22, 1989, now abandoned.

BACKGROUND OF THE INVENTION

This invention relates to window-actuator drive units in general and more particularly to an improved window-actuator drive unit.

A window-actuator which provides up-down movement of a window is disclosed in the German C2-35 19 056. In the actuator, a worm gear driven by an electric driving motor is rotatably supported on an axle, which is rigidly connected to the gear housing. The worm gear is placed in a rotational-slave relationship with a drive member by way of a coaxial driving disk, likewise rotatably supported on the axle, through axially protruding cams. In this known drive unit, provided for a cable window-actuator, the drive member is a cable pulley with at least one winding having its free end looped around a closed rope eye. The rope eye engages with a driving pin provided for the windowpane to be raised or lowered. The cable pulley is connected through the driving disk to the worm gear in a rotational-slave relationship. A worm shaft, which is mounted on the extended rotor shaft end of an electric driving motor, mates with this worm gear. The electric driving motor is flanged on to a cup-shaped gear housing. An axle is secured to the base of this housing and both the worm gear and the cable pulley, as well as the driving disk arranged between them, are rotatably supported on this axle. To provide the rotational-slave relationship between the worm gear and the driving disk, the driving disk is provided with axially projecting cams, which extend into corresponding carrier pockets of the worm gear, while a damping separator is used as an intermediate gear. To provide the rotational-slave relationship with the cable pulley, an eccentric projection on the driving disk is used, which engages with a complementary central recess of the cable pulley.

In other known electromotive window-actuator drive units for so-called arm or scissors-type window actuators, a driving arm is provided with toothing and mates with a driving pinion of the gear unit of the window-actuator drive unit. It is a known procedure to connect the driving disk, which has a rotational-slave relationship with the worm gear, to an axle journal by means of cams, so that they interlock. The method used is similar to the one described previously for cable window-actuators. In this case, however, the axle journal projects through the base surface of the cup-shaped gear housing and is mechanically attached to the driving pinion.

Although these drives work well, there is a need to reduce the expenditure for components used in both cable window-actuators and arm or scissors-type window actuators. This should be accomplished by providing a simple design, which is particularly suited for automated manufacturing.

SUMMARY OF THE INVENTION

This task is accomplished, assuming a window-actuator drive unit of the type mentioned in the beginning, preferably provided for driving a cable window-actuator, which includes driving disk with a shaft collar protruding on the side opposite from the worm gear. The shaft collar concentrically surrounds the axle with an outer grooved toothing to establish an interlocking, rotational-slave relationship with a cable window-actuator or a driving pinion of an arm or scissors-type window-actuator which have inner grooved toothing. Both the inner toothing of the cable pulley and the inner toothing of the driving pinion correspond to the outer toothing of the shaft collar.

Assuming the use of components which are already used for the most part in the assembly of a cable window-actuator drive unit, the design according to the invention makes it possible to produce a universal drive unit, which can be used for a cable window-actuator, as well as for an arm or scissors-type window-actuator, and, at the same time, advantageously forms an assembly unit. This assembly unit is independent of the driving mechanism which is used to connect to the window and can be assembled separately or disassembled for repair and can be sealed tightly to the outside.

In a particularly simple manner, which is advantageous for an automated production using robotics, the essential components can be easily interconnected using only one assembly direction. First, the driving disk with the shaft collar, which is one unit, can be connected to the free end of the axle. At the end of the shaft collar farthest from the driving disk, this component can be axially fixed in position to the axle by a catch lock which is used as a latch.

A design which is very simple for the technical production process but nevertheless guarantees a secure attachment is provided by a further refinement of the invention. In this refinement, the driving disk and the shaft collar are manufactured in one piece out of plastic. The axle, on its free end, is provided with radial, elastically flexible tongues with radial barbs at their extremities to form an interlocking snap-fit connection with the shaft collar in the operational end position of the driving disk.

DETAILED DESCRIPTION

Figure 1:
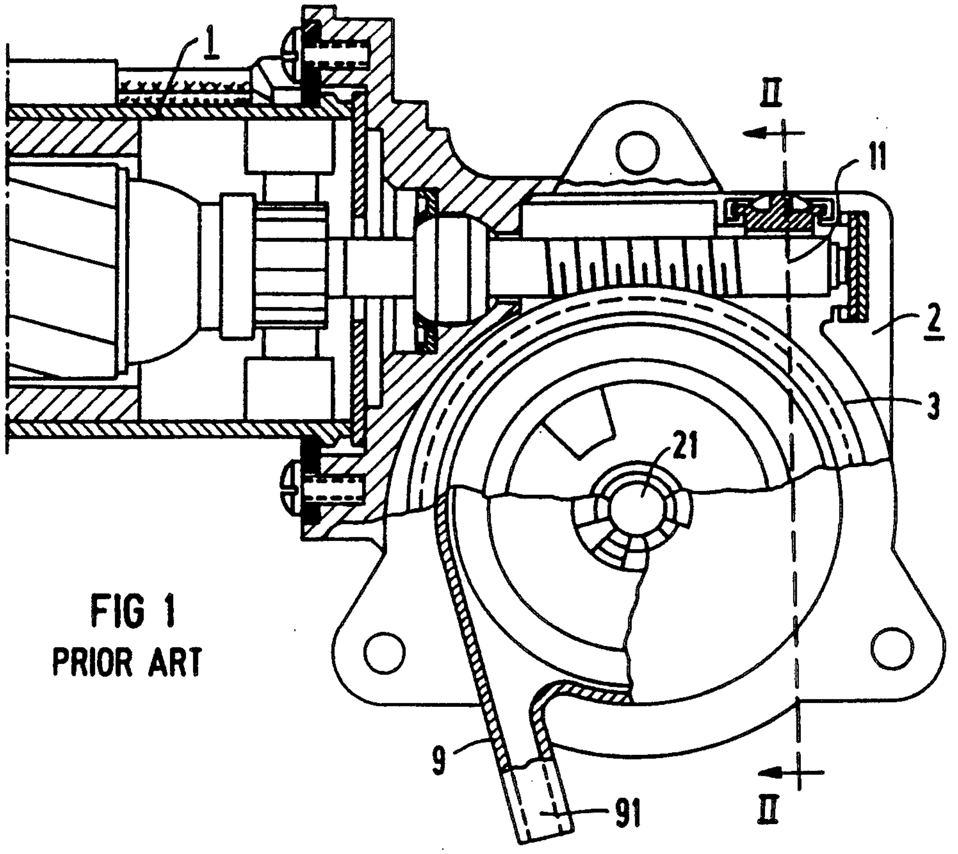
FIG 1 PRIOR ART
FIG. 1 is an axial view, partially in cross-section, illustrating the fundamental design of a cable window-actuator drive unit used in the art.

FIG. 1 shows an axial, longitudinal view, of the fundamental design of an electromotive drive unit used for a cable window-actuator in a motor-vehicle partially in section. The electric driving motor 1 is indicated only schematically; its elongated rotor shaft extends as a worm shaft 11 into a cup-shaped gear housing 2, which is flanged onto the housing of the electric driving motor 1, and mates with a worm gear 3. The worm gear 3 is connected as a slave to a cable pulley in a cable pulley housing 9, which is bolted to the gear housing 2 and has cable outlet openings 91 for the cable lines which couple to the carrier plate engaging the windowpane.

Figure 2:
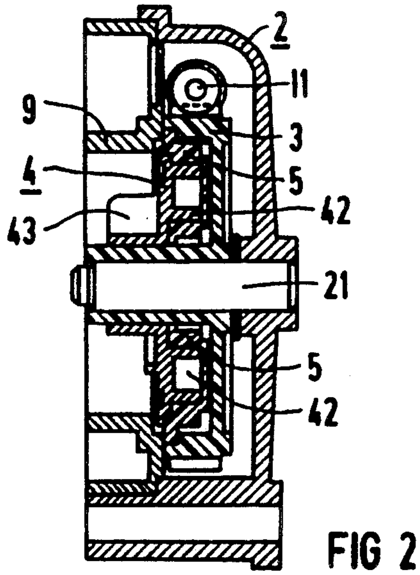
FIG 2 PRIOR ART
FIG. 2 is a radial cross-sectional view taken along line II—II in FIG. 1 of the gear housing of a known cable window-actuator drive unit.

As is apparent from FIG. 2 in particular, the worm gear 3 is rotatably supported on an axle 21, which has its right end secured in the cup-shaped base of the cup-shaped gear housing 2. A driving disk 4 is used to obtain the rotational-slave relationship between the worm gear 3 and the cable pulley (not shown in FIG. 2) which is housed in a cable pulley housing 9. This driving disk 4 slips into corresponding carrier pockets of the worm gear 3 by way of axially protruding cams distributed over the gear's circumference using a damping separator 5 as an intermediate gear. To effect the rotational-slave relationship between the driving disk 4 and the cable pulley (not shown here), the driving disk 4 has a slaving eccentric 43, which is aligned in the direction of the cable pulley and which mates with a corresponding opening of the cable pulley. As with the worm gear 3 and the driving disk 4, the cable pulley is also rotatably supported on the axle 21.

Figure 3:
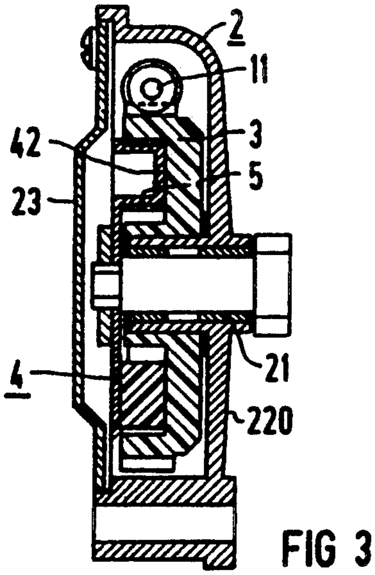
FIG 3 PRIOR ART
FIG. 3 is a radial cross-sectional view taken along line II—II in FIG. 1 of the gear housing of a known arm or scissors-type window-actuator drive unit.

FIG. 3 shows the well-known design of an arm or scissors-type window-actuator unit. As with the known cable window-actuator drive unit according to FIG. 2,, the worm gear 3 is driven by a worm shaft 11 installed on the extended motor shaft of the electric driving motor 1. The worm gear 3 is connected in a rotational-slave relationship to a driving disk 4, which slips into corresponding carrier pockets of the worm gear 3 by way of axially protruding cams 42 using a damping separator 5 as an intermediate gear. These carrier pockets are distributed over the circumference of the worm gear 3 with radial clearance to the axle 21. An axle journal is cottered by means of the driving disk 4. This axle journal passes through an axle bore of the axle 21 and also through the cup-shaped base of the gear housing 2, and, outside of the gear housing 2 it is rigidly connected to a driving pinion. The driving pinion mates with a driving arm of the arm or scissors-type window actuator which is provided with corresponding toothing. The open side of the gear housing 2 of this type of known arm or scissors-type window-actuator drive is sealed by means of a gear housing cover 23.

Figure 4:
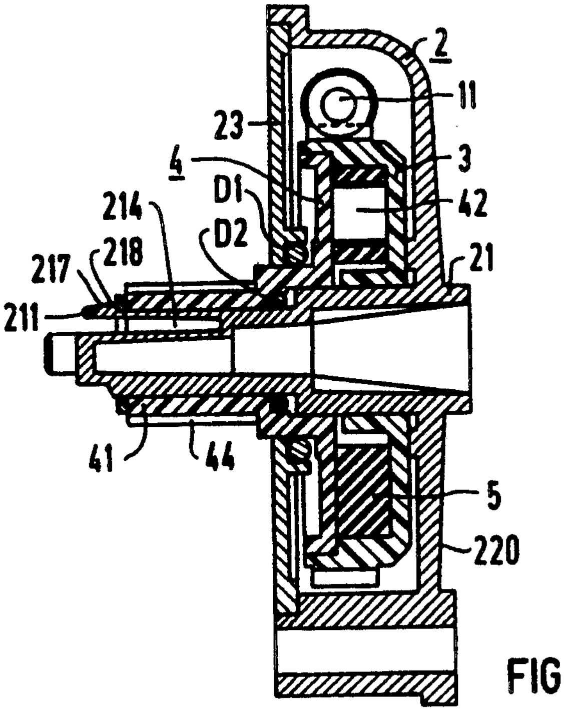
FIG. 4 a radial cross-sectional view taken along line II—II in FIG. 1 of the design according to the present invention with a drive unit for a cable window-actuator drive as well as for an arm or scissors-type window-actuator drive.

FIG. 4 illustrates the drive unit according to the present invention which is suitable as a universal component both for cable window-actuators and for arm or scissors-type window-actuators. In order to clearly show the essential parts, the electric driving motor, as well as the cable pulley and the cable pulley housing, are not shown.

Using a method similar to that of the known cable window-actuator drive unit according to FIG. 2, an axle 21 is secured to the housing base of the cup-shaped gear housing 2. Thus, a one-piece plastic component 220 composed of two parts is provided, i.e, the axle 21 which is die-cast directly on to cup-shaped housing 2. The worm gear 3, driven by the worm shaft 11, is rotatably supported on the axle 21. Like the known drive unit according to FIG. 2, carrier pockets are distributed over the circumference of the worm gear 3. With a damping separator 5 as an intermediate gear, slaving cams 42 of the driving disk 4 protrude axially toward the worm gear and slip into these carrier pockets. Thus, the driving disk 4 is also rotatably supported on the axle 21. The driving disk 4 has an axially unattached shaft collar 41, which is provided over its outer circumference with a grooved toothing.

Figure 5:
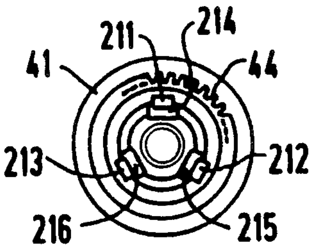
FIG. 5 is a front side plan view of the shaft collar of the drive unit according to FIG. 4.

As shown in FIG. 5, in order to fix the driving disk 4 axially to the axle 21, the axle 21 is provided around its circumference with three radial, elastically flexible tongues 211–213 having radial barbs on their ends. Of these, the barb of the tongue 211 bears the reference symbol 217 in FIG. 4. The radial elastic quality of the tongues 211–213 can be simply achieved by means of corresponding cut-outs 214–216 in the remaining section of the surrounding portion of the axle 21. To enable the shaft collar 41 to be mounted with a simple slip-fitting and with a subsequent latching attachment behind the barbs, these barbs have a leading slant, which for the case of the barb 217 of the tongue 211, bears the reference symbol 218.

Figure 6:
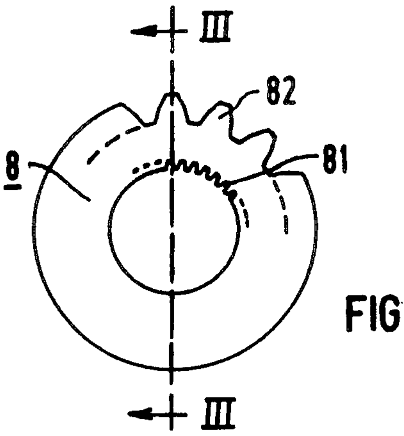
FIG. 6 is an axial plan view of a driving pinion attachable to the shaft collar for an arm or scissors-type window actuator.
Figure 7:
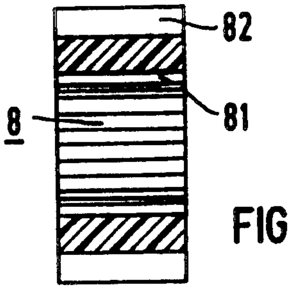
FIG. 7 is an axial cross-sectional view taken along line VII—VII in FIG. 6.
Figure 8:
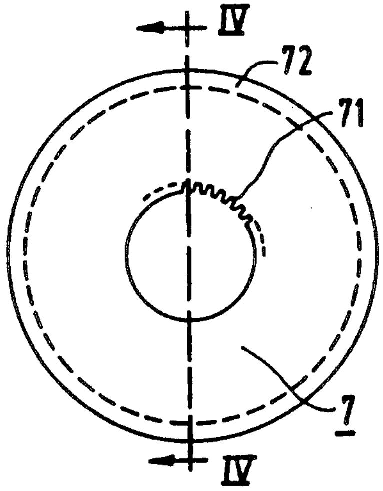
FIG. 8 is an axial plan view of a cable pulley attachable to the shaft collar according to FIG. 4.
Figure 9:
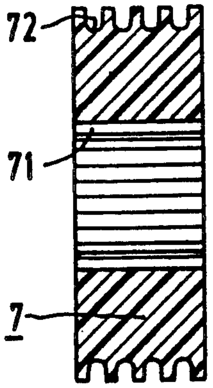
FIG. 9 is an axial cross-sectional view taken along line IX—IX in FIG. 8.

FIG. 6 is an axial plan view, and FIG. 7 an axial cross-section of a driving pinion 8 with pinion toothing 82 for driving a driving arm or an arm of a scissors-type window-actuator. Likewise, FIG. 8 is an axial plan view, and FIG. 9 a radial cross-section depicting a cable pulley 7 with a cable groove 72, which is used to take up a cable having a looped rope eye for a cable window-actuator. According to the invention, in order to effect the rotational-slave relationship with the shaft collar 41 of the driving disk 4, both the driving pinion 8 and the cable pulley 7 are provided with a inner grooving 81 or 71 corresponding to the grooved toothing 44 of the shaft collar 41.

The universal window-actuator drive unit according to the invention and described above, which is particularly apparent from FIG. 4, has the advantage of being designed as a component unit which can be preassembled and in case of repair, disassembled. It is sealed separately from the cable pulley or driving pinion so that it is dampproof. This is accomplished by enclosing the cup-shaped gear housing 2 with a gear housing cover 23. Axially abutting seals D1 and D2 are provided between the radial inner end of the gear housing cover 23 and the shaft collar 41 of the driving disk 4, as well as between the shaft collar 41 and the axle 21, respectively.

What is claimed is:

1. A window-actuator drive unit comprising: a gear housing; a worm gear; and electric driving motor with a wormshaft driving said worm gear; and axle rigidly connected to the gear housing on which said worm gear is rotatably supported; and a coaxial driving disk rotatably supported on the axle, slaved to said worm gear, said driving disk having a shaft collar protruding axially from the side of said disk opposite the worm gear, said collar concentrically surrounding said axle and having an outer grooved toothing; and a drive member forming either a cable pulley for a cable window-actuator, or a driving pinion of an arm or scissors-type window actuator, said drive member having an inner matching grooved toothing adapted to be mounted on said shaft collar, said drive member being mounted on said shaft collar to form an interlocking, rotational-slave relationship with said shaft collar of said driving disk.

2. The window-actuator drive unit of claim 1, wherein said driving disk and shaft collar are formed in one piece and are adapted to be inserted over said axle and further including a catch lock to axially fix in said one piece on the free axial end position of said axle farthest from said driving disk.

3. The window-actuator drive unit of claim 2, wherein said one piece is manufactured out of plastic and wherein said catch lock comprises radial, elastically flexible tongues having extremities with radial barbs formed on the free axial end of said axle to form an interlocking snap-fit connection with the shaft collar.

4. The window-actuator drive unit of claim 3, wherein said barbs are each provided with an axial leading slant, such that when the driving disk is axially attached, the barbs will be automatically pushed inwardly in the radial direction by said driving disk.

5. The window-actuator drive unit of claim 4 wherein said housing is cup-shaped with an open side and further including a gear housing cover closing said gear housing on said open side and a first axial abutting seal sealing the gear housing cover from the shaft collar.

6. The window-actuator drive unit of claim 5, and further including a second axial, sealingly abutting seal sealing the shaft collar from the axle.

7. The window-actuator drive unit of claim 1, wherein said drive member is removable and replaceable with another drive member is removable and replaceable with another drive member of a different type.

* * * * *